Aug. 2, 1949.  C. W. BERTHIEZ  2,477,953
COMBINATOR OF ELECTRIC CIRCUITS
Filed Oct. 12, 1945  5 Sheets-Sheet 1

Fig.1

Charles William Berthiez
INVENTOR
By George H. Corey
His Attorney

Fig. 2

Aug. 2, 1949.   C. W. BERTHIEZ   2,477,953
COMBINATOR OF ELECTRIC CIRCUITS
Filed Oct. 12, 1945   5 Sheets-Sheet 3

Fig.3

Charles William Berthiez
INVENTOR
By George H. Casey
His Attorney

Aug. 2, 1949.  C. W. BERTHIEZ  2,477,953
COMBINATOR OF ELECTRIC CIRCUITS
Filed Oct. 12, 1945  5 Sheets-Sheet 4

Fig. 4

INVENTOR
CHARLES WILLIAM BERTHIEZ
BY George H Corey
ATTORNEY

Aug. 2, 1949.    C. W. BERTHIEZ    2,477,953
COMBINATOR OF ELECTRIC CIRCUITS
Filed Oct. 12, 1945    5 Sheets-Sheet 5

INVENTOR
CHARLES WILLIAM BERTHIEZ
BY George H Corey
ATTORNEY

Patented Aug. 2, 1949

2,477,953

UNITED STATES PATENT OFFICE 2,477,953

COMBINATOR OF ELECTRIC CIRCUITS

Charles William Berthiez, Paris, France

Application October 12, 1945, Serial No. 622,038
In France March 1, 1945

27 Claims. (Cl. 175—375)

1

In certain automatically operating machines, such as machine tools and the like, it may become necessary to control the successive operations by means of a device generally called a combinator.

The task of the combinator consists in starting either successively or simultaneously, the various operations of a working cycle such as, for example, the cycle of machining.

The combinator generally comprises a single drum which, at every fraction of a revolution, establishes or opens one or several circuits of the machines thereby giving rise to serious difficulties when the working cycle includes a very large number of operations, because the drum, under these conditions, must then have dimensions such as will practically preclude its use.

The number of successive operations that may be controlled by means of a single combinator, as hitherto used, is therefore necessarily limited.

The invention has for its object a combinator of small dimensions by means of which a very large number of operations may be carried out.

According to the essential feature of the invention the various cycles of the desired operations are attained by the combination of contacts appertaining to different series and which are controlled, for each series, in a suitable order by elements that are staggered in respect of each other and driven as a whole.

In another feature of the invention the combinator utilizes, for each circuit of operation, at least two contacts that are connected in series and operated by means of cams carried by at least two drums that are adapted to rotate step by step in such a way that each drum will describe an entire revolution for every step or notch of the succeeding drum.

According to a third feature of the invention the motors driving the aforesaid drums are automatically set in motion by means of relays, the first of these relays being energized by a current impulse occasioned by the closing of a contact actuated at the desired moment by a suitable movable element of the machine and by the closing of a contact controlled by a cam provided with the necessary number of bumps, said cam being called the current impulse control cam and being mounted on the first of the aforesaid drums while the second relay (controlling the motor of the second drum) is energized, at the ending of each revolution of the first drum, by a current impulse occasioned by the closing of a contact that is actuated by a cam with one bump carried on the first of the aforesaid cam drums, the said one bump cam on each drum being the cur-

2 rent impulse control cam for the following drum when there are more than two drums.

According to a further feature of the invention, after each advancement step the motors driving the aforesaid cam drums are automatically stopped by the opening of a contact connected in the circuit of auto-excitation or holding contact of the respective relay and controlled by a cam provided on the drum corresponding to said relay and having a suitable number of bumps, this cam being called a "stop cam of normal operation."

According to a fifth feature of the invention a supplementary cam, provded on each of the aforesaid drums and having formed thereon a bump extending along a suitable length of arc, acts upon a contact connected in series with the other analogous contact or contacts of the other drum or drums respectively in a circuit connected across the contact controlled by the stop cam of normal operation.

According to a sixth feature, a star wheel is utilized for each drum in order to insure the exact indexing of each drum, said star wheel being formed with as many notches as there are successive angularly spaced positions to be given to the respective drum and being held in each position by a resilient device such as a spring and a follower acting against the bottom of the corresponding notch, the resilient action of this device being overcome during the first phase of the movement due to the camming action of the star wheel tooth and the resilient device acting as a motor under the influence of its tensioned or compressed spring, so as to move the star wheel to bring the drum into its correct position when the follower reaches the bottom of the notch.

These and other objects, characteristics and advantages are attained by the embodiment illustrated in the accompanying drawing in which.

According to the invention it is possible to design a device affording the control of any number of circuits. However, by way of example, description will be given of an embodiment providing for the control of 64 circuits. Then, it will be explained that by the provision of certain means in the device it is possible to make it control any number of circuits up to 64. As an example, a description will be given of the modifications necessary to make the device suitable for the control of 44 circuits.

Figure 1:
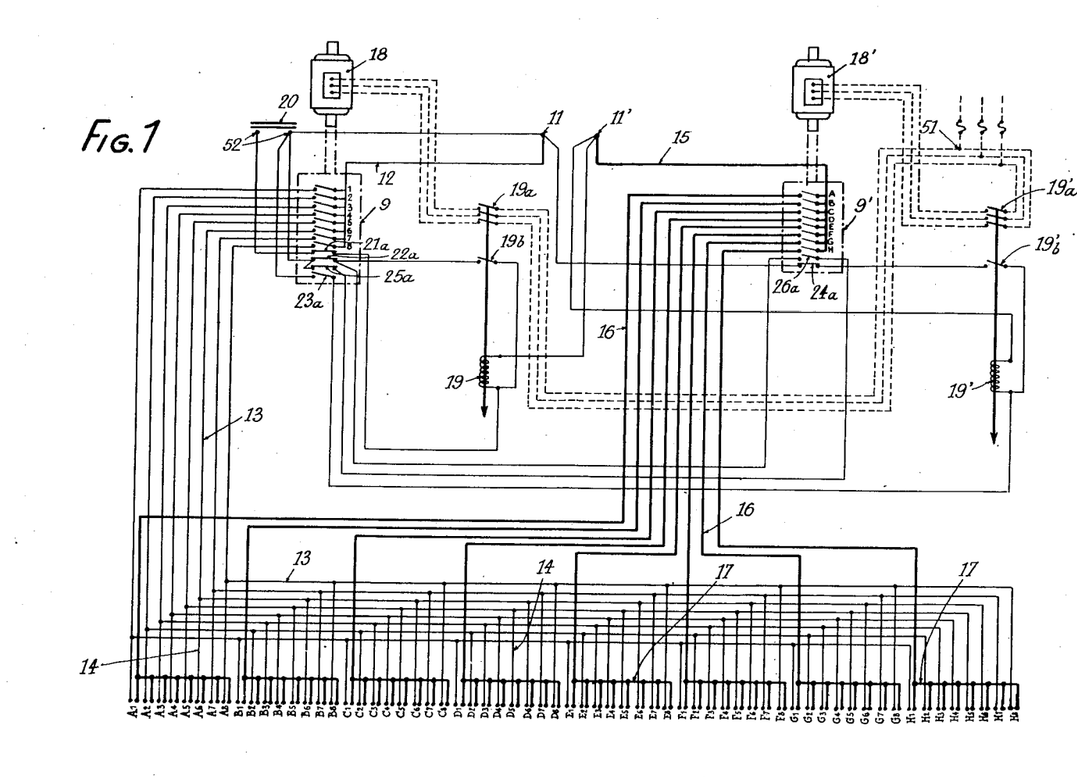
Fig. 1 shows a wiring diagram of a combinator according to the invention.
Figure 2:
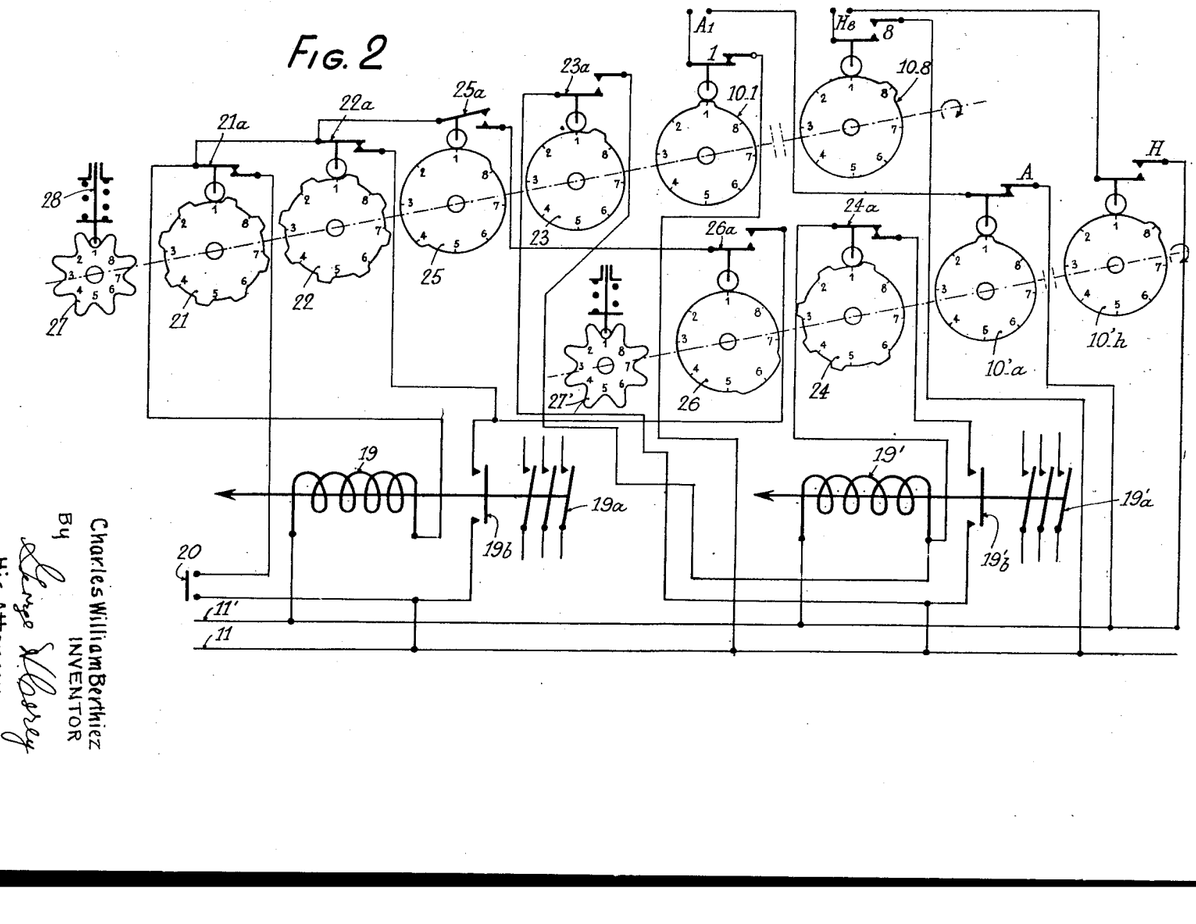
Fig. 2 shows a schematic arrangement of the various elements of the combinator.
Figure 3:
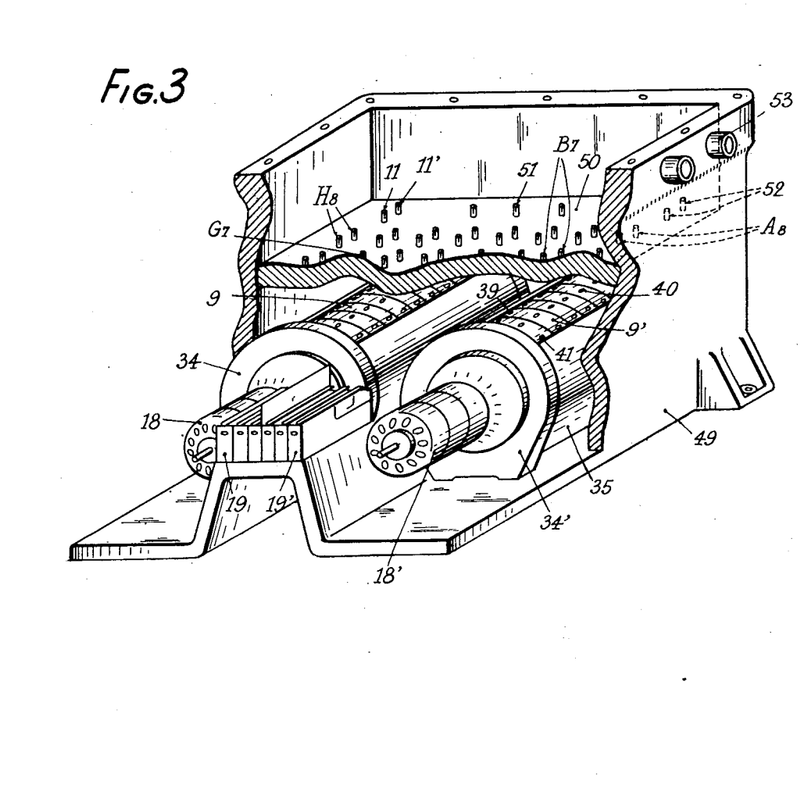
Fig. 3 is a perspective view of a part of the combinator with its several elements in place.
Figure 4:
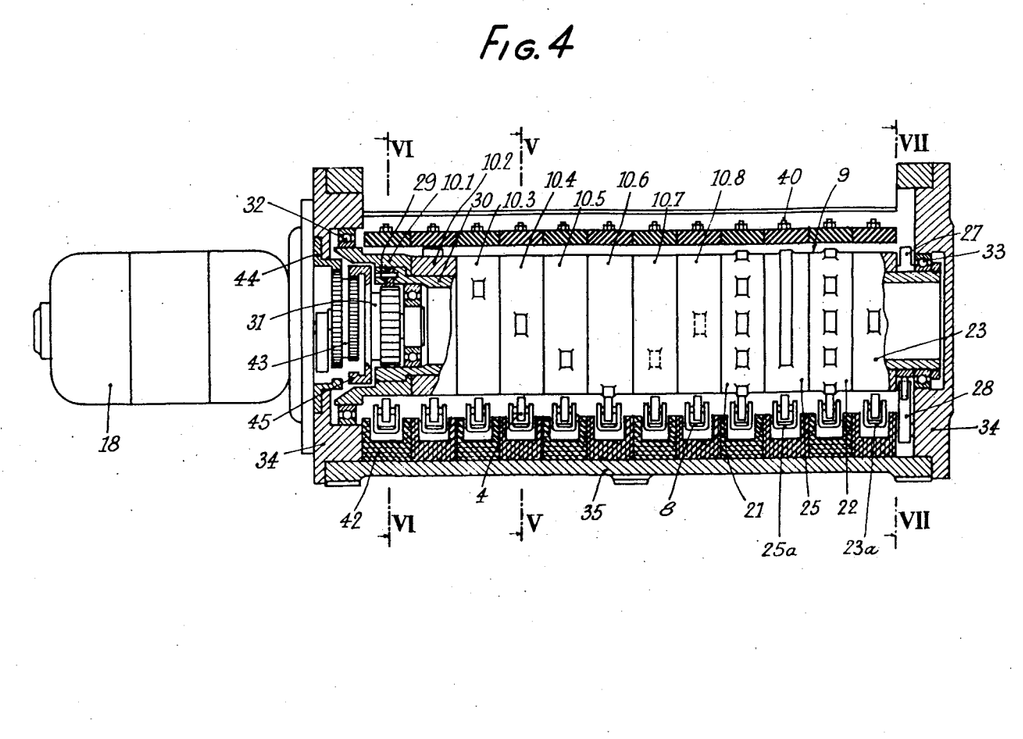
Fig. 4 is a longitudinal cross section of one of the drums utilized in the combinator.

The combinator shown in the drawing comprises two cam drums 9 and 9' (Fig. 3) adapted for step by step movement in steps of ⅛ revolution at a time or multiples thereof, said drums respectively having cams 10—1 to 10—8 and 10'a to 10'h carried thereon (Figs. 2 and 4), arranged along their respective axes, and adapted for respectively closing eight contacts, that is, contacts 1 to 8 or contacts A to H respectively associated with drums 9 and 9' (see Figs. 1, 2 and 4). With a view to simplifying the description, the contacts of the drum 9 have been designated by numerals (1 to 8), this drum being referred to hereafter as "numeral drum," while the contacts of the other drum 9' have been designated by letters (A to H), so that this drum will be called hereafter "letter drum."

While the numeral drum 9 moves one eighth of a revolution at each impulse imparted by a suitable movable element of the machine which the combinator controls, the second or letter drum 9' moves ⅛ of a revolution only after the numeral drum has made a complete revolution.

The several circuits, that can be controlled by the combinator according to the invention, are connected to sixty-four pairs of terminals symbolically designated as $A_1 \ldots A_8$—$B_1 \ldots B_8$—$G_1 \ldots G_8$—$H_1 \ldots H_8$.

It will be seen that each circuit connected to any one of the pairs of terminals $A_1$ to $A_8$ includes one of the contacts 1—8 of the first drum and one of the contacts A—H of the second drum. The following combinations, therefore, may be obtained: 1—A, 2—A, 3—A ... 8—A; 1—B, 2—B ... 8—B; 1—C, ... 8—C; ... 1—H, 2—H, ... 8—H, corresponding to sixty-four pairs of terminals $A_1 \ldots H_8$ and sixty-four different possible circuits.

To this end, the respective contact elements 1 are, for example, connected, on the one hand, to the wire of line 11 and, on the other hand, to one of the terminals of the pair $A_1$, while the respective contact elements A are, for example, connected, on the one hand, to the second wire of line 11' and, on the other hand, to the other terminal of the pair $A_1$ Figs. 1 and 2. The same applies to the other "numeral" or "letter" contacts.

To make these connections, the arrangement shown in Fig. 1 is preferably chosen in which contacts 1—8 are connected, on the one hand, to the wire of line 11 by means of a common wire 12 and, on the other hand, to one side of the pairs of terminals $A_1$—$A_8$, by a series of feed wires 13 and connecting wires 14. In this arrangement also, contacts A to H are connected, on the one hand, by a common wire 15 to the line wire 11', while, on the other hand, these same contacts are connected by a series of feed wires 16 and a series of connecting wires 17 to the other side of the pairs of terminals $A_1$—$H_8$.

It will be seen from the foregoing that sixty-four different circuits can thus be formed with the two series of eight contacts, one series associated with each of drums 9 and 9'.

More generally stated, if there were for each circuit "$n$" contacts, (instead of 2) connected in series and, consequently, "$n$" drums (instead of 2) each provided with N contacts (instead of 8) and rotating $\frac{1}{N}$ revolution at each step, the number of possible combinations would be $N^n$.

Hereafter there will be described in connection with the particular example chosen for disclosing the invention a combinator with two drums each having eight contacts for the formation of sixty-four different circuits utilizing several complementary elements, in accordance with the invention.

Each drum 9 or 9' is driven, as will be described more fully hereafter, by an independent electric motor 18 or 18' respectively, the feeding circuit of which may be closed by contacts 19a or 19'a by the action of a relay 19 or 19' (see Figs. 1 and 2). Relay 19 is connected between the two line wires 11 and 11' by means of a contact 20, which is actuated at the desired moment by a suitable movable element of the machine on which the combinator is mounted, and by a second contact 21a which is actuated by a cam 21 with eight bumps (see Fig. 2) so that this contact will be successively opened and again closed eight times for each revolution of drum 9 carrying cam 21. This cam 21 thus controls the current impulse generated on the closing of contact 20, and being consequently designated as "current impulse control cam."

This contact 21a effectively cuts off the energizing circuit of the relay 19 in case the impulse, imparted by the machine (the duration of which is function of the speed of the elements in motion), should still persist during the rotary movement of the drum.

A holding circuit, comprising a holding contact 19b and a back contact 22a, actuated by a stop cam 22, having eight bumps formed thereon, is provided for relay 19 so that this holding circuit will open eight times per revolution to cut off the feeding of motor 18.

It will thus be seen that by this arrangement of the cams 21 and 22 the drum 9 will be caused to turn step by step one eighth of a revolution at a time on the successive closings of contact 20 that is actuated by the movable element of the machine.

Relay 19' corresponding to the "letter" drum 9' is likewise connected between the two line wires 11 and 11' by means of an intermediate front contact 23a that is actuated to closed position by a single bump cam 23 on drum 9.

For relay 19' a holding circuit is provided which includes a contact 19'b and back contact 24a actuated by a stop cam 24 having a suitable number of bumps formed thereon—for example, eight bumps if it is desired to obtain all of the sixty-four possible combinations between contacts 1 to 8 and A to H in view of obtaining sixty-four different circuits.

If the desired automatic cycle of the machine comprises less than sixty-four operations, the drums, after the last desired operation, must be restored to their initial position in a continuous rotational movement. To this end it is necessary to provide supplementary cams 25 and 26 on the "numeral" and "letter" drums respectively.

In the embodiment shown in Fig. 2 let it be supposed that the cycle of the machine were to include only 44 operations. This would be equivalent to 5 x 8 plus 4 operations. It will, therefore, be necessary for the "numeral" drum 9 to rotate through five complete revolutions and four fractions of a revolution, while the "letter" drum 9' will move only six fractions of a revolution. To accomplish this operation cam 24 is provided with six bumps only, that is, five corresponding to the five revolutions of the "numeral" drum and one corresponding to the four additional steps, instead of being provided with eight bumps as previously stated in the case of 64 different circuits to be controlled. In this case the holding circuit of relay 19' is therefore interrupted six times per cycle to cut off the supply to the motor 18'.

It is to be seen that the cam 23, acting as releasing means for "letter" drum 9' with stop cam 24, makes it possible for the "letter" drum 9' to rotate ⅛ of its circumference for five steps at the end of each revolution of the "numeral" drum 9, the last three eighths of the revolution of the drum being covered without stopping.

Another circuit that will be cut off only after the "letter" drum has been returned to its initial position is tapped from the holding circuit of relay 19 and comes into operation after the fortieth operation.

Cam 26 of the "letter" drum, after leaving position 5, closes its contact 26a actuated by the bump 6, thereby completing a circuit parallel to the holding circuit of relay 19, this circuit likewise including the contact 25a that is operated by cam 25. It will be seen that this circuit is opened by cam 25 for the first four positions and closed for positions 5, 6, 7 and 8.

Cam 24 comprises furthermore but six closing positions for its contact 24a. The operation is then as follows:

After the fortieth operation, cam 24 rotates a fraction of a revolution and reaches position 6 where it stops upon opening of contact 24a. Simultaneously cam 26 closes the first contact 26a connected in the parallel holding circuit of relay 19, the second contact 25a in series with contact 26a in this circuit remaining open.

For the first four positions, that is, positions 1 to 4 on cam 25, this cam operates to maintain the contact 25a open but, after the fourth position, cam 25 will close the second contact 25a of the parallel holding circuit. The motor driving the "numeral" drum 9 then continues to revolve without stopping until it reaches position 1 when the cam 25 will open its contact 25a. The parallel holding circuit of the relay 19 then ceases to act and cam 22 again resumes its normal function of cutting off the holding circuit of said relay.

The impulse imparted by cam 23 closes the feeding circuit of relay 19' which will be maintained closed by contact 24a only to open again when the "letter" drum 9' has returned into its initial position, since cam 24 is formed with but six bumps.

In the system shown in Fig. 1 it is possible to control 64 circuits by connecting these circuits to the terminals $A_1$, $A_2$, $A_3$, ... $H_7$, $H_8$, these circuits being established in succession as determined by the corresponding cams 10—1 to 10—8 and A to H on the respective drums. If it is desired to control less than 64 circuits the desired circuits may be connected to a reduced number of the terminals $A_1$ to $H_8$. For example, in the control of 44 circuits as described above connection may be made only to the first 44 terminals, namely $A_1$ to $F_4$, inclusive. It will be understood from the above description that the cam 25 on drum 9 and the cams 24 and 26 on drum 9' must be of particular form and must be suitably positioned on the respective shafts of the drums to operate in succession the additional circuits in excess of 40, that is four in the example described, and to return the drum to the initial position upon completion of operation of the 44 circuits. The arcuate length of the bump on cam 25, the position of the bump on cam 26 and the number of bumps on cam 24 must be such that the contacts 25a, 26a and 24a actuated by the cams are maintained opened and closed as the case may be to secure the requisite step by step operation during the cycle and to secure continuous operation of the respective motors driving the drums 9, 9' to return the drums to the initial positions when the cycle is completed.

In the embodiment described for 44 circuits the bump of the cam 25 extends from adjacent but not including the position 8 thereon to and including the position 4 in order that the contact 25a may be maintained opened from the moment shortly after the drum 9 moves from position 8 to the initial position until shortly after it has moved from the position 4 in the succeeding rotation thereof. If 53 circuits, for example, were to be controlled the bump on cam 25 would extend to include the position 5 thereon, that is 5 more than 48. Correspondingly the bump on cam 26 would be placed symmetrically with position 7 and the bumpless portion of cam 24, which for 44 circuits extends from position 6 to position 8 inclusive, would extend only from position 7 to position 8, a bump being provided at position 7. Other modifications of these cams and their positions will be apparent in order to secure the control of any desired number of circuits within the limits for which a given embodiment of the apparatus is constructed.

As has been described hereinabove the machine, such as a machine tool, at the start of a cycle, closes a current impulse contact 20 thereby exciting relay 19, the contacts 19a of which start the small electric motor 18 and set the "numeral" drum 9 in motion. It has further been seen that, on discontinuance of the electric impulse, relay 19 still remains excited by the holding contact 19b. It was also seen that, on being driven by motor 18, the "numeral" drum 9 describes ⅛ of a revolution, the holding circuit of relay 19 is cut by the action of the cam 22 provided with eight equidistant bumps, whereupon the motor stops. In order to allow for the inertia of the motor the holding circuit is actually cut off before the end of the cycle. As however, an exact indexing of the drum must be ensured, an additional element 27 in the form of a star wheel (see Figs. 2 and 7) has been provided.

This star wheel is provided with eight notches which are adapted to be engaged by a spring device 28 which is lifted by the teeth of the star wheel during the first half of each step in the rotation of the drum and which during the second half of the step brings the drum into exact angular position after the device 28 has dropped back into the next following notch.

The bumps of the cam 22 are arranged in such a manner that the holding circuit will be cut off when spring 28 has first passed beyond the tooth of the star wheel and has entered the next notch.

A free ratchet wheel or overrun device 29 comprising a pawl inserted between the cam shaft 30 and the planetary gearing hereafter described which is driven by motor 18 (see Figs. 4 and 6) enables the former to rotate at a greater speed than motor 18 during the second part of the run, that is, while the spring device 28 is operating as a motor.

The electric motor 18 thus drives the drum only during the first part of the run, thereby eliminating its inertia.

It will be understood that a star wheel 27' similar to star wheel 27 and having similar functions is provided also for the "letter" drum 9'.

A preferred embodiment, as shown more particularly in Figs. 3 to 7, of the constructive and driving arrangement for drum 9 or 9' respectively will now be described in a more detailed form.

Referring first to Fig. 4, it will be seen that cams 10—1 to 10—8 are fastened upon a hollow shaft 30 in such manner that their bumps are in staggered relation to each other, the angular displacement thereof from one bump to the next being 45°.

The hollow shaft 30 carries, furthermore, auxiliary cams 21, 25, 22 and 23, as well as a star wheel 27. The shaft 30 may be mounted on suitable bearings 32 and 33 in two flanges or walls 34 provided on the outer parts of a supporting housing 35 (see also Fig. 3). The various cams revolve in front of their respective aligned contacts (a few of which only have been indicated by reference numerals in the lower part of Fig. 4).

Figure 5:
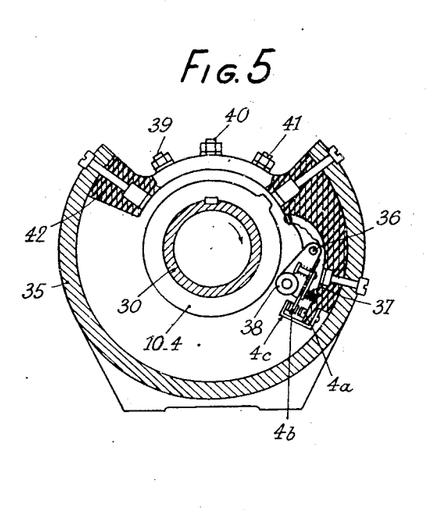
Figs. 5, 6 and 7 are sections respectively taken on lines V—V, VI—VI and VII—VII of Fig. 4.

As shown in Fig. 5, each contact comprises a stationary element such as 4a and a movable element such as 4b mounted for pivotal movement about a shaft or stud 36, said contact being biased to its original position by a spring 37. The cam (in Fig. 5 cam 10—4) fastened upon the hollow shaft 30 engages during its rotation a roller 38 forming part of the movable contact element 4b and brings the latter against the stationary contact element 4a.

In order to make available as many combinations as possible as well as to provide the front or back contacts as the case may be required to be operated by the different cams, it will be preferable that the various contacts used be changeover or double throw contacts. To this end, the movable contact element 4b will be arranged so as to bear, while at rest, against a second stationary element 4c. In this manner, in accordance with the connections established by the terminals 39, 40 and 41, connected respectively to these contacts either a contact biased to closed position, a contact biased to open position or a double throw contact respectively may be established at will by selection of the proper terminal.

The electric connection of the terminals 39 and 40 respectively, with the stationary contacts 4a and 4c is obtained by means of rigid conductors, while that of the terminal 41 with the movable contact element 4b will be realized by a flexible conductor.

All parts constituting the contacts and the terminals are mounted in a supporting part 42 made of insulating material. All of the insulating supports 42 are aligned and stacked side by side within the metallic housing 35 (see also Fig. 4).

The electric motor 18 drives the cam shaft 30 through a planetary reducing gear.

This reducing gear comprises a large satellite pinion 43 that is supported eccentrically to the motor shaft upon a shaft describing a planetary movement about the motor shaft. This pinion 43, which is rotatable on its shaft, is provided with two sets of teeth, the first set having teeth meshing with a stationary crown or ring gear 44, the second being likewise provided with teeth meshing with a movable crown or ring gear 45 forming part of the shaft 31 driving the shaft 30 by means of a pawl 29. The ratio of the two sets of teeth is such as to provide a high ratio of reduction from a higher to a lower speed.

Figure 6:
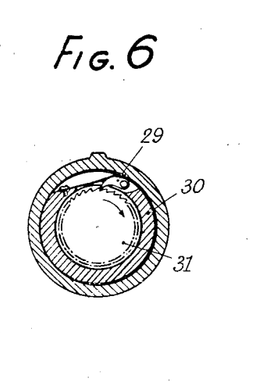

It is consequently to be seen that while motor 18 is running it will drive crown 45 and shaft 31 forming part thereof by the intermediary of the pinion 43 with double toothing. Shaft 31 on its part will, on turning in the direction of the arrow f (Fig. 6), operate pawl 29 mounted on the cam carrying shaft 30 by means of the ratchet wheel on shaft 31. When operating as a motor by the action of the spring device 28, this pawl 29 permits release of shaft 30 to run ahead of the ratchet wheel in the direction of arrow f (Fig. 6).

Figure 7:
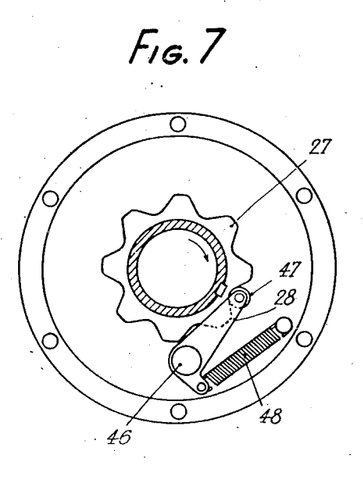

Fig. 7 shows a preferred practical embodiment of the spring device 28 comprising a bent lever mounted for swinging movement about a fixed point 46 and carrying a roller 47 biased by a spring 48 successively into engagement with the notches of star wheel 27.

Fig. 3 is a view in perspective showing part of the combinator. The latter is mounted inside a casing 49 and comprises a platen 50 carrying all of the terminals $A_1$—$A_2$ ... $H_8$ of the beginning of the control circuit, and other terminals of interconnection (terminals 51 of the feeding circuits for the motor, terminals 52 of the interconnecting impulse circuit with the combinator, current terminals of the line wires 11 and 11', see Fig. 1), provided with water tight cable outlets 53. A suitable cabling arrangement (not shown) is provided between terminals 39, 40 and 41 and the terminals 51 under the removable platen 50. The casing 49 may be closed by a suitable cover (not shown).

It will be understood that the hereabove described device, as illustrated in the drawings, may be varied in its details of execution without departing from the general scope of the invention, this more especially in respect to the maximum number of circuits which it may be desired to provide. Thus each drum may be fitted with a number of principal combination contacts greater or smaller than eight; furthermore, if a very large number of circuits were to be realized, more than two cam drums might be utilized, the third drum and the following ones being arranged in accordance with the identical general characteristics as drums 9 and 9'.

It will be seen that, in all cases, the invention permits the control of a very large number of operations in a device requiring only an extremely restricted space. As has been explained hereabove, by simply replacing cams 24, 25 and 26 by other cams a combinator designed for a given maximum number of different circuits, may be utilized for the control of any number of circuits less than this maximum. Finally, it likewise appears that, due to the contacts comprising three elements (two stationary and one movable element) a very wide variety of circuit controls may be provided.

It furthermore appears, without departing from the scope of the invention, that dispositions and arrangements different from those indicated hereabove and illustrated in Figs. 3 to 7 may be used in assembling the various elements of the combinator as well as for the control of the cam drums.

These various possible arrangements, dispositions, combinations and constructional variations therefore, which embody the features of the invention are intended to be covered by the appended claims.

What I claim is:

1. In a combinator of electric circuits, at least two electric contacts connected in series for each operating circuit, at least two electrically driven drums respectively associated with said contacts, a plurality of cams respectively carried by said drums for actuating said contacts, driving means for said drums, and means operatively connecting said drums to drive one in a predetermined relation to the other.

2. In a combinator of electric circuits for control of a machine tool or the like, at least two electric contacts connected in series for each operating circuit, at least two electrically driven drums respectively associated with said contacts, a plurality of sets of staggered cams carried by said drums for actuating said contacts, means effective when energized for driving each drum at a predetermined speed, at least two relays respectively operatively connected to energize said drum driving means, a special cam provided on one of said drums, a series of bumps formed on said special cam, a contact actuated by said cam and connected into the circuit of one of said relays, a second contact connected into the same circuit and actuatable by a movable element of the machine tool, a further cam carried on the same drum and having a single bump formed thereon and adapted to actuate the second of said relays.

3. In a combinator of electric circuits, at least two electric contacts connected in series for each operating circuit, at least two electrically driven rotatable drums respectively associated with said contacts, a plurality of sets of staggered cams carried by said drums for actuating said contacts, means effective when energized for driving each drum at a predetermined speed, a star-wheel fastened to each drum to rotate therewith, a plurality of notches provided on said star-wheel corresponding to the successive positions to be occupied by the drum, a spring device adapted to successively rest in each of said notches and effective to determine the position of the drum upon deenergization of said driving means.

4. In a combinator of electric circuits, at least two electric contacts connected in series for each operating circuit, at least two electrically driven rotatable drums respectively associated with said contacts, a plurality of sets of staggered cams carried by said drums for actuating said contacts and means effective when energized for driving each drum at a predetermined speed, a star-wheel fastened to each drum to rotate therewith, a plurality of notches provided on said star-wheel corresponding to the successive positions to be occupied by the drum, a spring device adapted to successively rest in each of said notches and effective to determine the position of the drum upon deenergization of said driving means, and an overrun gear mounted between the driving shaft of the cam drum and said drum.

5. In a combinator of electric circuits, at least two electric contacts connected in series for each operating circuit, at least two electrically driven drums respectively associated with said contacts, a plurality of cams respectively carried by said drums for actuating said contacts, a motor for driving each drum at a predetermined speed, a planetary reducing gear arranged between each drum and its driving motor, and means operatively connecting said motors to effect driving operation of one of said motors and its drum upon completion of a predetermined driving operation of the other motor and its drum.

6. In a combinator of electric circuits, at least two electric contacts connected in series for each operating circuit, at least two electrically driven drums respectively associated with said contacts, a plurality of cams respectively carried by said drums for actuating said contacts, driving means for said drums, each of said contacts being formed of an element movable between two stationary elements and actuated by a cam carried by one of said drums, and means operatively connecting said driving means for said drums to effect driving operation of one of said drums upon completion of a predetermined driving operation of the other drum.

7. In a combinator of electric circuits, at least two electric contacts connected in series for each operating circuit, at least two electrically driven drums respectively associated with said contacts, a plurality of cams respectively carried by said drums, driving means for said drums, said contacts respectively being actuated by cams on said two drums and each being formed of an element movable between two stationary elements, insulating blocks stacked up side by side and supporting said contact elements for engagement by said cams, and terminals for said elements mounted upon said blocks.

8. In a combinator of electric circuits for a machine tool or the like, at least two electric contacts connected in series for each operating circuit, at least two electrically driven drums respectively associated with said contacts, a plurality of sets of staggered cams respectively carried by said drums for actuating said contacts, means effective when energized for driving each drum at a predetermined speed, at least two relays respectively operatively connected to energize said drum driving means, a special cam provided on one of said drums, a series of bumps formed on said special cam, a contact actuated by said cam and connected into the circuit of one of said relays, a second contact connected into the same circuit and actuatable by a movable element of the machine tool, a further cam carried on the same drum and having a single bump formed thereon and adapted to actuate the second of said relays, holding circuits for said relays, another special cam provided on each drum for actuating a contact connected in series with the holding contacts of the respective relays.

9. In a combinator of electric circuits for a machine tool or the like, at least two electric contacts connected in series for each operating circuit, at least two electrically driven drums respectively associated with said contacts, a plurality of sets of staggered cams respectively carried by said drums for actuating said contacts, means effective when energized for driving each drum at a predetermined speed, at least two relays respectively operatively connected to energize said drum driving means, a special cam provided on one of said drums, a series of bumps formed on said special cam, a contact actuated by said cam and connected into the circuit of one of said relays, a second contact connected into the same circuit and actuable by a movable element of the machine tool, a further cam carried on the same drum and having a single bump formed thereon and adapted to actuate the second of said relays, an additional cam provided on each drum and having a bump of a predetermined length, and contacts respectively actuated by said additional cams and connected in series with each other and with said first relay.

10. In a combinator of electric circuits for a machine tool or the like, at least two electric contacts connected in series for each operating circuit, at least two electrically driven drums respectively associated with said contacts, a plurality of sets of staggered cams respectively carried by said drums for actuating said contacts, means effective when energized for driving each drum at a predetermined speed, at least two relays respectively operatively connected to energize said drum driving means, a special cam provided on one of said drums, a series of bumps formed on said special cam, a contact actuated by said cam and connected into the circuit of one of said relays, a second contact connected into the same circuit and actuatable by a movable element of the machine tool, a further cam carried on the same drum and having a single bump formed thereon and adapted to actuate the second of said relays, holding circuits for said relays, another special cam provided on each drum for actuating a contact connected in series with the holding contacts of the respective relays, an additional cam provided on each drum and having a bump of a predetermined length, and contacts respectively actuated by said additional cams and connected in series with each other and with said holding contacts of said first relay.

11. In an electrical control system for controlling operation of a machine tool or the like, at least two controllers, means energizable to operate each controller, means actuated by one of said controllers upon operation thereof from at least one position to another and operatively connected to and effective to energize the means energizable to operate another of said controllers to operate said other controller from at least one position to another in a predetermined relation to said first controller, each of said controllers having associated therewith a plurality of circuit-selecting contacts connectible to respective circuits upon operation of the controller with which said contacts are associated, said contacts in the two controllers being so interconnected as to determine a plurality of circuits for each position of said first controller in accordance with said predetermined relation of the operations of said controllers, and means actuatable by an element of the machine tool for effecting energization of said means energizable to operate the controllers.

12. An electric control system for operating a machine tool or the like which comprises a plurality of controllers each having a plurality of circuit selecting contacts connected respectively to control circuits of said system and actuatable to energize said circuits upon operation of the controller with which the contact is associated, a plurality of electrical means respectively associated with and for operating said controllers, a control contact actuatable by an element of said machine tool in the operation thereof, a contact actuatable by one of said controllers and connected to said control contact for energizing one of said electrical controller operating means upon actuation of said control contact to initiate operation of said controller, an auxiliary contact actuated by said operated controller for energizing another of said controller operating means to operate its controller, and contacts actuated by said controllers to stop operation thereof.

13. An electric control system for operating a machine tool or the like according to claim 12 in which said circuit selecting contacts of one controller respectively are connected in series in the selected circuit with the circuit selecting contacts of a second controller.

14. An electric control system for operating a machine tool or the like according to claim 12 in which each circuit selecting contact of one controller is connected in parallel to a plurality of circuits and in series in the selected circuit with the respective circuit selecting contact of another controller, said contact of said other controller being connected in parallel to a different plurality of circuits which includes said selected circuit.

15. An electrical controller comprising a plurality of rotatable drums, an electric motor connected to rotate a given one of said drums, control means for said motor, a plurality of cycle-determining contacts respectively associated with said drums and operatively connected with the control means of said motor, means operatively connected to said drums for actuating said cycle-determining contacts to effect rotation of said motor and its drum when said drums are in positions of rotation in a predetermined angular relation to each other, means actuated by said given drum upon rotation thereof for controlling rotation of a second drum, and circuit-controlling contacts actuated upon actuation of said drums.

16. An electrical controller comprising a pair of rotatable drums, electric motors connected respectively to rotate said drums, control means for each motor, a pair of cycle-determining contacts respectively associated with said drums and operatively connected with the control means of a given one of said motors, means operatively connected to said drums for actuating said cycle-determining contacts to effect rotation of said given motor and its drum when said drums are in positions of rotation in a predetermined angular relation to each other, means actuated by said given drum upon rotation thereof and connected to the control means of the other of said motors for controlling rotation of the second drum, and circuit-controlling contacts actuated upon rotation of said drums.

17. An electrical controller comprising a pair of rotatable drums, an electric motor connected to rotate a given one of said drums, control means for said motor, a pair of cycle-determining contacts connected in series with each other and with said control means of said motor to maintain operation of said motor and its drum when said contacts are closed, cycle-determining means respectively operated by said drums and effective respectively to actuate the cycle-determining contacts associated with said drums to closed position for a predetermined rotation of the drum associated therewith and thereafter to open said contacts, means actuated by said given drum upon rotation thereof for controlling rotation of the second drum, said cycle-determining means for the two drums being operatively connected to operate in a predetermined relation to each other to determine the cycle by the combined rotations of the drums, and a set of circuit controlling contacts associated with each drum and successively actuated upon rotation of the drum with which they are associated.

18. An electrical controller as defined in claim 15 which comprises a contact repeatedly actuated upon rotation of said given drum intermittently to operate the motor of said drum to produce step-by-step rotation thereof, certain of said circuit-selecting contacts on at least said given drum respectively being actuated at each step.

19. An electrical controller as defined in claim 15 in which said cycle-determining contacts are connected in series with each other and with said control means of said given motor, and means operatively connected to said drums for operating said cycle-determining contacts to effect stopping of said given drum upon operation of at least one of said cycle-determining contacts to operate said control means to stop said motor.

20. An electrical controller comprising a pair of rotatable drums, electric motors connected respectively to rotate said drums, a relay for each motor for effecting energization thereof, a pair of cycle-determining cams, one mounted on each drum for rotation therewith, contacts respectively actuated by said cams and connected in series in a circuit with the relay of the motor connected to a given one of said drums to effect rotation of said given drum through a predetermined angle of rotation when said cams on said drums are rotated into positions in a predetermined relation to each other, a contact actuated upon rotation of said given drum and connected to the relay of the motor connected to the second drum for effecting rotation of said second drum to effect actuation of the contact actuated by the cycle-determining cam mounted on said second drum, and circuit-selecting contacts actuated upon rotation of said drums.

21. An electrical controller comprising at least two distinct sets of electrical contacts, controlling means for each of said sets of contacts, means for respectively driving said controlling means step by step to actuate in each step a contact of the set controlled by the respective controlling means, and means for starting one of said step by step driving means when another of said step by step driving means has reached a predetermined step.

22. An electrical controller comprising at least two drums each of which carries a plurality of cams, a set of electrical contacts associated with each drum, the contacts of each set being respectively actuated by the cams of the drum with which said set is associated, motors respectively adapted to drive said drums, relays respectively connected to said motors for controlling said motors, and means operated upon driving operation of one of said motors for controlling the relay of the other motor to operate said other motor when rotation of said first motor has driven its drum to a predetermined position.

23. In an electrical control system, at least two sets of circuit selecting contacts, each contact of each set being connected to a contact of another set to cooperate therewith to control a circuit and being connected to another contact of said other set to cooperate therewith to control a different circuit, means operatively connected to said sets of contacts for actuating in succession the respective contacts of the respective sets, and means for actuating the contacts of a given set in its succession subsequently to the operation in succession of at least some of the contacts of another set.

24. In an electrical control system, at least two sets of circuit selecting contacts, each contact of each set being connected in series in a circuit with a contact of another set to cooperate therewith to control said circuit, each contact being connected in series with a second contact of said other set to cooperate therewith to control a second circuit connected in parallel with the first circuit to said first contact, means operatively connected to said sets of contacts for actuating in succession the respective contacts of the respective sets, the respective contacts of a given set being actuated upon the completion respectively of the successions of actuations of the contacts of said other set.

25. An electrical controller comprising at least two sets of circuit selecting contacts, means operatively connected to one of said sets of contacts for actuating the respective contacts of said set in succession, means operatively connected to another of said sets of contacts for actuating the respective contacts thereof in succession, and means operatively connecting said means actuating said sets of contacts for effecting the successive actuation of said other set of contacts in a predetermined relation to successive actuation of said first set of contacts.

26. An electrical controller comprising a plurality of circuit selecting contacts, each of said contacts being actuatable to control a circuit, means operatively connected to said contacts and operable to actuate said contacts in succession to control said circuits in succession, at least two additional circuit selecting contacts, each actuatable to control a circuit, additional means operatively connected to said additional contacts and operable to actuate said additional contacts in succession, and means operatively connecting said means operable to actuate said plurality of contacts to said additional means operable to actuate said additional contacts for actuating said additional contacts in succession in predetermined relation to the completion of the successions of actuations of said plurality of contacts.

27. An electrical controller comprising a plurality of rotatable drums, an electric motor connected to rotate at least one of said drums, a relay for said motor for effecting energization thereof, a contact actuated upon rotation of a given drum and connected to said relay for energizing said motor to effect rotation of said motor driven drum, and a contact actuated upon rotation of said motor drum and connected to said relay for effecting deenergization thereof upon a predetermined rotation of said motor driven drum.

CHARLES WILLIAM BERTHIEZ.

REFERENCES CITED

The following references are of record in the file of this patent:

UNITED STATES PATENTS

| Number | Name | Date |
| --- | --- | --- |
| 2,050,378 | Randall | Aug. 11, 1936 |
| 2,398,007 | Hunter | Apr. 9, 1946 |

Certificate of Correction

August 2, 1949

Patent No. 2,477,953

CHARLES WILLIAM BERTHIEZ

It is hereby certified that errors appear in the printed specification of the above numbered patent requiring correction as follows:

Column 3, line 9, before the word "movement" insert *rotary*; column 6, line 65 for "first" read *just*; column 14, line 49, after "motor" insert *driven*; and that the said Letters Patent should be read with these corrections therein that the same may conform to the record of the case in the Patent Office.

Signed and sealed this 27th day of December, A. D. 1949.

[SEAL]

THOMAS F. MURPHY,
*Assistant Commissioner of Patents.*